United States Patent
McCaffrey et al.

(10) Patent No.: US 12,326,114 B2
(45) Date of Patent: Jun. 10, 2025

(54) GAS TURBINE ENGINE WITH CORE DEBRIS PROTECTION

(71) Applicant: RTX CORPORATION, Farmington, CT (US)

(72) Inventors: Michael G. McCaffrey, Windsor, CT (US); Anthony R. Bifulco, Ellington, CT (US); Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/450,040

(22) Filed: Aug. 15, 2023

(65) Prior Publication Data
US 2025/0059915 A1    Feb. 20, 2025

(51) Int. Cl.
| | |
|---|---|
| F02C 7/052 | (2006.01) |
| F02C 7/04 | (2006.01) |
| F02C 7/057 | (2006.01) |
| F02C 9/20 | (2006.01) |
| F02K 3/06 | (2006.01) |
| F02K 3/075 | (2006.01) |
| F04D 29/32 | (2006.01) |
| F04D 29/56 | (2006.01) |

(52) U.S. Cl.
CPC .............. *F02C 7/052* (2013.01); *F02C 7/04* (2013.01); *F02C 7/057* (2013.01); *F02K 3/075* (2013.01); *F04D 29/323* (2013.01); *F04D 29/563* (2013.01); *F02C 9/20* (2013.01); *F02K 3/06* (2013.01)

(58) Field of Classification Search
CPC .. F02C 7/05; F02C 7/052; F02C 7/055; F02C 7/057; F02C 3/06; F02C 9/16; F02C 9/18; F02C 7/04; F01D 5/143; F01D 5/145; F01D 5/146; B64C 11/02; B64C 11/14

USPC ....................................................... 60/39.092
See application file for complete search history.

(56) References Cited

U.S. PATENT DOCUMENTS

| | | | |
|---|---|---|---|
| 3,684,857 A | 8/1972 | Morley et al. | |
| 3,922,852 A * | 12/1975 | Drabek | F01D 7/00 416/165 |

(Continued)

OTHER PUBLICATIONS

European Search Report for EP Application No. 24194798.5 dated Jan. 14, 2025.

*Primary Examiner* — Sabbir Hasan
*Assistant Examiner* — Wesley Le Fisher
(74) *Attorney, Agent, or Firm* — Carlson, Gaskey & Olds, P.C.

(57) ABSTRACT

A fan has a rotating bulge defining a radially outermost point of the rotating cone relative to a rotational axis. The rotating bulge is defined by a radially outwardly extending forward portion leading to the radially outermost point on the bulge and then a radially inwardly extending portion aft of the radially outermost point of the bulge leading into the core engine path within the splitter housing. The core splitter housing has a leading edge, and the bulge radially outermost point being upstream of the leading edge of the splitter housing. The bulge radially outermost point is a first radial distance from a rotational axis, and the leading edge of the splitter housing being at a second radial distance of the rotational axis, and a ratio of the first radial distance to the second radial distance being at least 0.95.

16 Claims, 4 Drawing Sheets

(56) References Cited

U.S. PATENT DOCUMENTS

| | | | | |
|---|---|---|---|---|
| 3,986,794 A * | 10/1976 | Korn | | F01D 7/00 415/129 |
| 4,005,574 A * | 2/1977 | Smith, Jr. | | F02K 3/06 60/228 |
| 4,055,042 A * | 10/1977 | Colley | | F02K 3/06 415/77 |
| 4,064,692 A * | 12/1977 | Johnson | | F02K 3/077 60/762 |
| 4,509,962 A * | 4/1985 | Breitman | | F02M 35/022 55/306 |
| 4,900,221 A * | 2/1990 | Ciokajlo | | F01D 25/162 415/142 |
| 4,928,480 A * | 5/1990 | Oliver | | F02C 7/052 55/306 |
| 5,123,240 A * | 6/1992 | Frost | | F04D 27/0215 55/306 |
| 5,201,801 A * | 4/1993 | Smith, Jr. | | F02C 7/05 60/226.1 |
| 5,279,109 A * | 1/1994 | Liu | | F02K 3/075 60/785 |
| 5,307,623 A * | 5/1994 | Antuna | | B64D 27/18 60/226.1 |
| 6,129,509 A * | 10/2000 | Cousin | | F02C 7/052 55/306 |
| 8,082,727 B2 * | 12/2011 | Roberge | | F02K 3/065 60/226.3 |
| 9,003,759 B2 * | 4/2015 | Suciu | | F02K 3/068 60/39.092 |
| 9,739,154 B2 * | 8/2017 | Derclaye | | F04D 29/542 |
| 10,060,263 B2 * | 8/2018 | Van Ness | | F04D 29/544 |
| 10,174,763 B1 * | 1/2019 | Orosa | | F01D 5/146 |
| 10,253,784 B2 * | 4/2019 | Fulayter | | B64C 11/325 |
| 10,683,806 B2 | 6/2020 | Moniz et al. | | |
| 10,724,435 B2 * | 7/2020 | Kroger | | F04D 29/563 |
| 10,774,788 B2 * | 9/2020 | Feulner | | F02C 3/045 |
| 11,111,855 B2 * | 9/2021 | Dierksmeier | | F02C 7/042 |
| 11,401,824 B2 * | 8/2022 | Breeze-Stringfellow | | F02K 5/00 |
| 11,767,790 B2 * | 9/2023 | Sibbach | | F02C 7/04 415/208.1 |
| 11,781,506 B2 * | 10/2023 | Kupratis | | F02K 3/077 60/792 |
| 11,859,560 B2 * | 1/2024 | Mouly | | F16H 1/28 |
| 2004/0031260 A1 | 2/2004 | Orlando et al. | | |
| 2009/0145101 A1 * | 6/2009 | Suciu | | F01D 5/022 60/39.092 |
| 2016/0076380 A1 * | 3/2016 | Van Ness | | F01D 5/142 415/208.1 |
| 2016/0333734 A1 | 11/2016 | Bowden et al. | | |
| 2018/0238341 A1 | 8/2018 | Nolcheff et al. | | |
| 2019/0024587 A1 * | 1/2019 | Smith, III | | F02C 3/04 |
| 2021/0262416 A1 * | 8/2021 | Pal | | F02K 3/062 |
| 2021/0381431 A1 | 12/2021 | Kupratis et al. | | |
| 2023/0374939 A1 * | 11/2023 | Pachidis | | F02C 7/042 |

\* cited by examiner

GAS TURBINE ENGINE WITH CORE DEBRIS PROTECTION

BACKGROUND OF THE INVENTION

This application relates to a gas turbine engine wherein protection is provided for limiting debris that can enter a core engine.

Gas turbine engines are known, and typically include a propulsor delivering air into a bypass duct as bypass air. The air also passes into a core engine, and then to a compressor section. The air is compressed in the compressor section and delivered into a combustor where it is mixed with fuel and ignited. Products of this combustion pass downstream over turbine rotors, driving them to rotate.

It is known that there are challenges with gas turbine engines encountering potential debris such as a bird strike, large dirt particle, etc.

SUMMARY OF THE INVENTION

In a featured embodiment, a gas turbine engine includes a fan having a plurality of fan blades received within a fan case. The fan rotates with a rotating cone. The fan delivers air into a bypass duct radially outwardly of a core splitter housing having a leading edge, and radially inwardly of the core splitter housing into a core engine path leading to a compressor section. The rotating cone has a rotating bulge defining a radially outermost point of the rotating cone relative to a rotational axis of the fan blades and cone. The rotating bulge is defined by a radially outwardly extending forward portion leading to the radially outermost point on the bulge and then a radially inwardly extending portion aft of the radially outermost point of the bulge leading into the core engine path within the splitter housing. The core splitter housing has a leading edge, and the bulge radially outermost point being upstream of the leading edge of the splitter housing. The bulge radially outermost point is a first radial distance from a rotational axis, and the leading edge of the splitter housing being at a second radial distance of the rotational axis, and a ratio of the first radial distance to the second radial distance being at least 0.95.

In another embodiment according to the previous embodiment, the fan case has a case bulge portion extending to define a radially outermost location aft of a fan case portion aligned with the fan blades.

In another embodiment according to any of the previous embodiments, the ratio is at least 1.0.

In another embodiment according to any of the previous embodiments, a dirt flap is positioned within the core engine path.

In another embodiment according to any of the previous embodiments, an upstream fan exit guide vane is positioned downstream of the fan blades and upstream of the leading edge of the splitter housing.

In another embodiment according to any of the previous embodiments, the upstream fan exit guide vane is axially aligned with the rotating bulge.

In another embodiment according to any of the previous embodiments, a downstream fan exit guide vane is positioned to extend between the fan case and the core splitter housing.

In another embodiment according to any of the previous embodiments, a compressor inlet guide vane is positioned within the core splitter housing and upstream of a compressor section.

In another embodiment according to any of the previous embodiments, the upstream fan exit guide vane does not have constant camber along an entire radial extent.

In another embodiment according to any of the previous embodiments, there is increased camber in the upstream fan exit guide vanes at a radially inner location.

In another embodiment according to any of the previous embodiments, a variable inlet guide vane is positioned aft of the upstream fan exit guide vane, and an orientation of the variable inlet guide vane is changed to control flow downstream of the variable inlet guide vane.

In another embodiment according to any of the previous embodiments, a second splitter housing is positioned radially outwardly of the core splitter housing, and a secondary bypass duct is defined inwardly of the second splitter housing.

In another embodiment according to any of the previous embodiments, the variable inlet guide vane is not covered radially outward of the variable inlet guide vane.

In another embodiment according to any of the previous embodiments, a dirt flap is positioned within the core engine path.

In another embodiment according to any of the previous embodiments, an upstream fan exit guide vane is positioned downstream of the fan blades and upstream of the leading edge of the core splitter housing.

In another embodiment according to any of the previous embodiments, the upstream fan exit guide vane is aligned with the rotating bulge.

In another embodiment according to any of the previous embodiments, the upstream fan exit guide vane does not have constant camber along an entire radial extent.

In another embodiment according to any of the previous embodiments, a variable inlet guide vane is positioned aft of the upstream fan exit guide vane, and an orientation of the variable inlet guide vane is changed to control flow downstream of the variable inlet guide vane.

In another embodiment according to any of the previous embodiments, a second splitter housing is positioned radially outwardly of the core splitter housing, and a secondary bypass duct is defined inwardly of the second splitter housing.

In another embodiment according to any of the previous embodiments, the ratio is at least 1.0.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
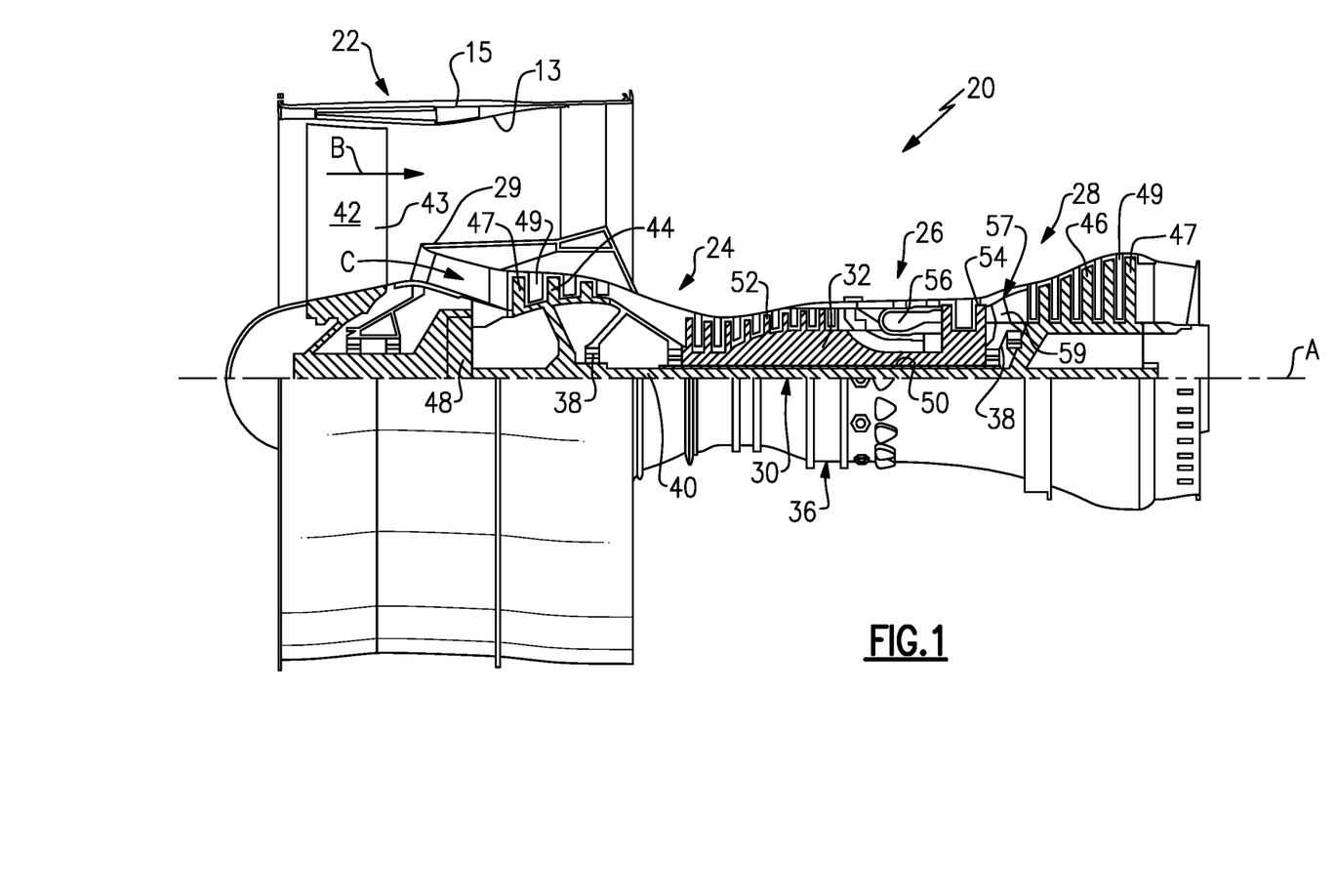
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °\ R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
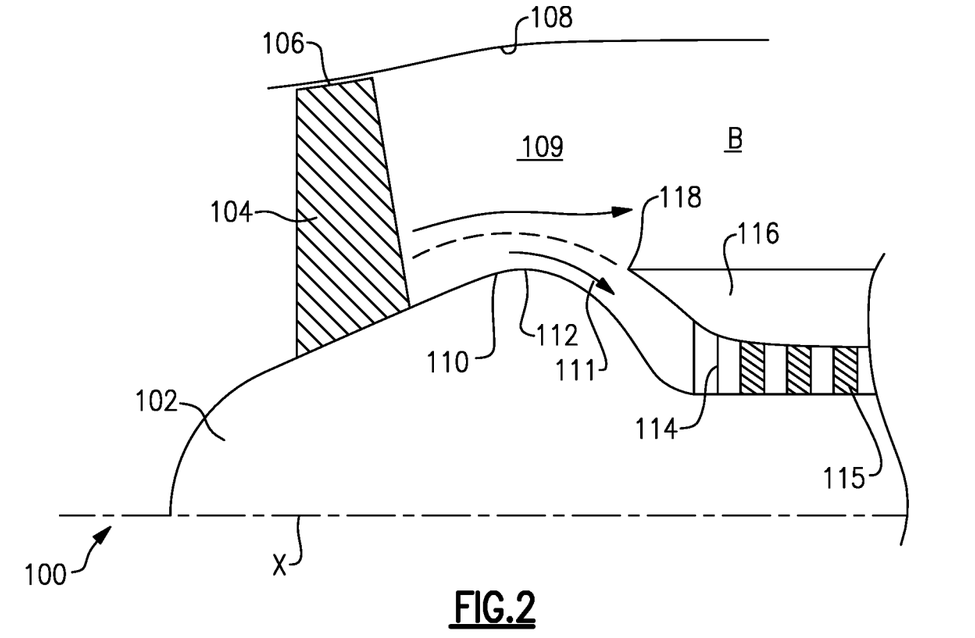
FIG. 2 shows a first embodiment core engine debris protection scheme.

FIG. 2 shows a gas turbine engine 100 having a rotating nose cone 102 rotating with a plurality of fan blades 104. The fan blades 104 are mounted within a fan case 106. An inner surface of the fan case 106 does not extend along a common radial distance from a rotational axis X. Instead, as shown at 108, the flow path is bulged outwardly downstream of the fan blades 104. This increases the size of an airflow chamber 109 upstream of a leading edge 118 of a splitter housing 116. The splitter housing 116 separates the chamber 109 into the bypass duct B and into a core airflow 111 leading to a compressor section 115. A compressor entry guide vane 114 is also shown.

As shown, there is a bulge 110 on the rotating hub or cone 102. The bulge 110 defines a radially outermost point 112 of the cone relative to a rotational axis. The rotating bulge 110 is defined by a radially outwardly extending forward portion leading to the radially outermost location 112 on the bulge and then a radially inwardly extending portion aft of the radially outermost point 112 of the bulge leading into a core engine path 111 within the splitter housing 116. The bulge 110 radially outermost point 112 is within at least 95%-105% percent of a radial distance to the leading edge 118. In embodiments, the radial distance to the point 112 is equal to or greater than a radial distance to the leading edge 118.

The bulge 110 blocks "line of sight" passage downstream of the fan blades 104 from reaching the core airflow 111. The bulge area 108 will maintain airflow Mach number goals within airflow chamber 109 and reduce losses.

Heavy objects will not be able to enter the core airflow 111, as their momentum would be too great. As an example, a bird that strikes the fan will be deflected into the bypass duct B. The same would be true of heavy and medium dirt and dust particles.

Figure 3:
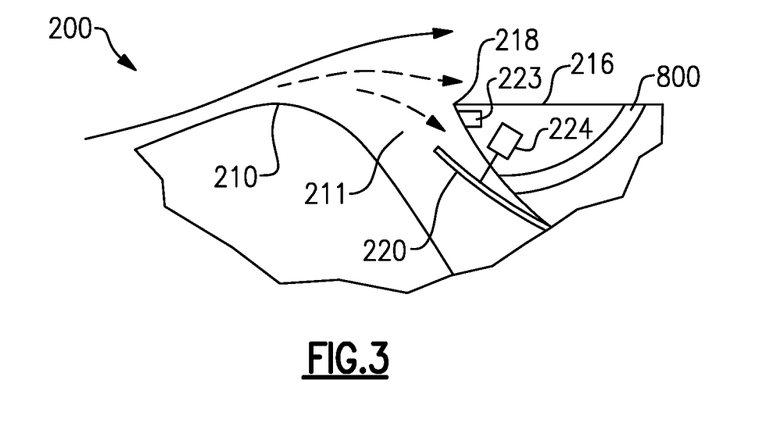
FIG. 3 shows another feature which can be incorporated into the FIG. 2 embodiment.

FIG. 3 shows an embodiment 200 having the bulge 210, the core airflow 211, and a leading edge 218 of a splitter housing 216. A dirt flap 220 is positioned within the core airflow 211, the dirt flap 220 being upstream of the compressor section 115, to capture smaller dirt particles. The dirt flap 220 may be actuated individually or as a set linked together, around the circumference via a unison ring. The actuation method could be by a solenoid, a jackscrew, air cylinder or a fuel/hydraulic cylinder. The dirt flap 220 position is controlled by the engine full authority digital electronic controller ("FADEC"), with the opening and closing based upon a predetermined operating schedule and/or in response to a sensor which detected the presence of dirt in the core airflow 211. An actuator 224 is shown schematically, as is a sensor 223. The dirt is directed into passage 800, and then into the bypass duct.

Figure 4:
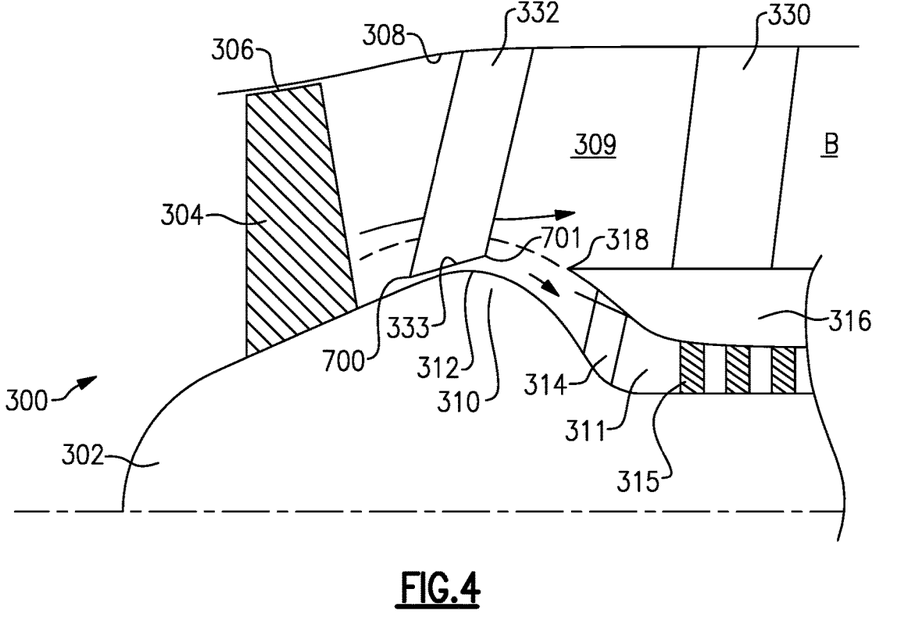
FIG. 4 shows another embodiment protection scheme.

FIG. 4 shows another embodiment 300 wherein structure which is similar to FIG. 2 is shown with the same numeral, however, increased to lead with 300. As shown, a fan exit guide vane 332 is positioned in the area of the bulges 310 and 308. The fan exit guide vane 332 is downstream of the fan blades 304, and upstream of the leading 318 of the splitter housing 316. As shown, a typical fan exit guide vane 330 is also positioned within the bypass duct B. The fan exit guide vane 332 is axially aligned with the bulge 310. By positioning a fan exit guide vane here, the fan airflow will be straightened and will improve the ability for the core airflow to enter the compressor 315 with minimal losses. The exit guide vane 332 may be mechanically attached and cantilevered from the bulge 308 and attached to a portion of the bulge 310 which is not rotatably connected to the rotating hub or cone 302. A ring 333 may extend circumferentially to connect the exit guide vanes 332.

As shown, a leading edge 700 of the exit guide vane 332 extends radially inwardly for a greater extent than does the trailing edge 701.

Due to this convergence, an aerodynamic loading diffusion factor is managed to more feasible levels. The diffusion factor is larger at the inner diameter than the outer diameter, and the convergence helps to manage this.

Figure 5:
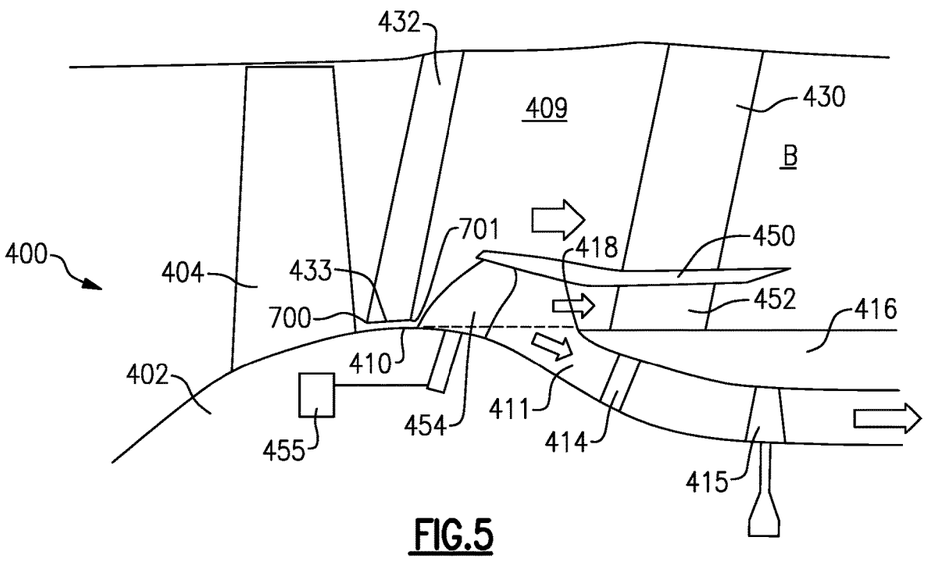
FIG. 5 shows a further feature which can be added into the FIG. 4 embodiment.

FIG. 5 shows another embodiment 400. Again, structure that operates similar to the FIG. 4 embodiment have been identified with a common reference number, however, increased to begin with 400. In this embodiment, a second splitter housing 450 is positioned to define a second fan airflow 452. The core splitter 416 again defines the core airpath 411. However, a variable inlet guide vane 454 is mounted downstream of the fan exit guide vane 432 but upstream of the leading edge 418. The variable inlet guide vane 454 is controlled by actuator 455 to remove swirl from the air heading to the core airflow 411. The variable inlet guide vane 454 will also control the amount of flow that will enter the core airflow 411, and the secondary airflow 452, compared to the bypass duct flow in bypass duct B.

Figure 6:
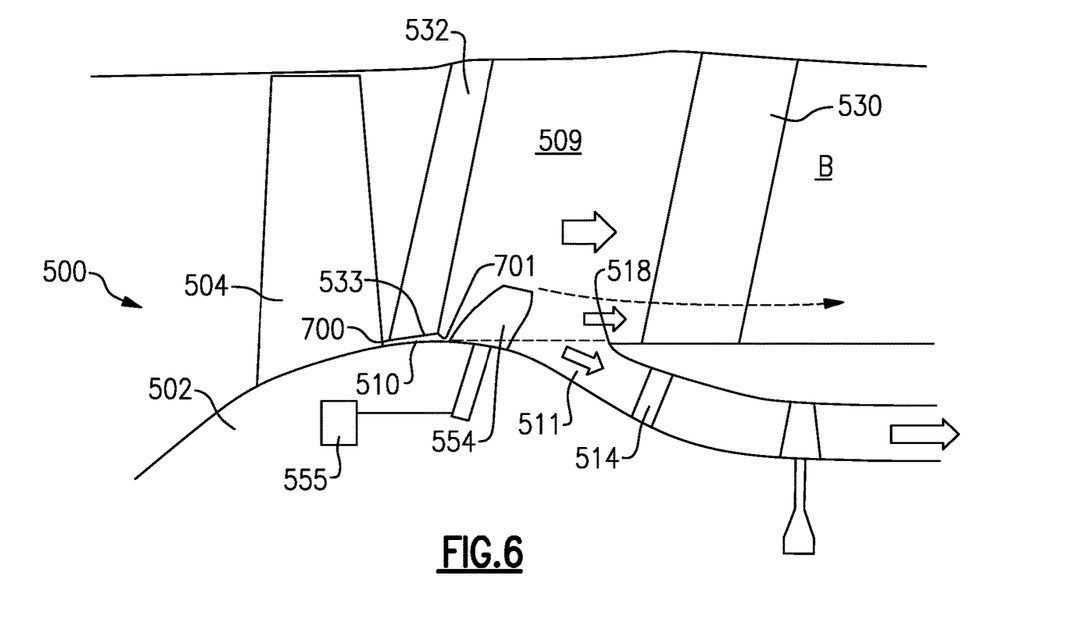
FIG. 6 shows an alternative feature that could be added to the FIG. 4 embodiment.

FIG. 6 shows an embodiment 500. Here again, items that are similar to the FIG. 5 engine have been identified with common numerals, however, increased to begin with 500. A variable inlet guide vane 554 is not provided upstream of a second splitter housing. Rather, the inlet guide vane simply delivers some airflow back into the bypass duct B, and some into a core airflow 511.

Figure 7:
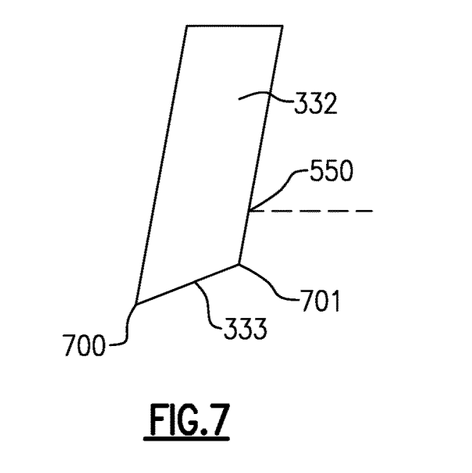
FIG. 7 explains a feature with regard to a fan exit guide vane in each of the FIGS. 4-6 embodiment.

FIG. 7 shows a feature of the upstream fan exit guide 332. The same may be true of the fan exit guide vanes of FIGS. 5 and 6. An airfoil of the fan exit guide vane 332 is not provided with constant camber along its entire radial extent. Rather, increased camber is provided in a radially inner portion to remove swirl and to assist driving air into the core airflow. In one embodiment the increased camber section is within a 20% span point 550 of an overall radial length of the fan exit guide vane 332 at the trailing edge.

The same convergence mentioned with regard to FIG. 4 occurs with the fan exit guide vanes in FIGS. 5-7.

A gas turbine engine under this disclosure could be said to include a fan having a plurality of fan blades received within a fan case. The fan rotates with a rotating cone. The fan delivers air into a bypass duct radially outwardly of a core splitter housing having a leading edge and radially inwardly of the core splitter housing into a core engine path leading to a compressor section. The rotating cone has a rotating bulge defining a radially outermost point of the rotating cone relative to a rotational axis of the fan blades and cone. The rotating bulge is defined by a radially outwardly extending forward portion leading to the radially outermost point on the bulge and then a radially inwardly extending portion aft of the radially outermost point of the bulge leading into the core engine path within the core splitter housing. The core splitter housing has a leading edge, and the bulge radially outermost point is upstream of the leading edge of the splitter housing. The bulge radially outermost point is a first radial distance from a rotational axis, and the leading edge of the splitter housing is at a second radial distance of the rotational axis, and a ratio of the first radial distance to the second radial distance being at least 0.95.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
a fan having a plurality of fan blades received within a fan case, said fan rotating with a rotating cone;
the fan delivering air into a bypass duct radially outwardly of a core splitter housing having a leading edge, and radially inwardly of the core splitter housing into a core engine path leading to a compressor section;
the rotating cone having a rotating bulge defining a radially outermost point of the rotating cone relative to a rotational axis of the fan blades and cone, the rotating bulge defined by a radially outwardly extending forward portion leading to the radially outermost point on the bulge and then a radially inwardly extending portion aft of the radially outermost point of the bulge leading into the core engine path within the core splitter housing, and the bulge radially outermost point being upstream of the leading edge of the core splitter housing, the bulge radially outermost point being a first radial distance from a rotational axis, and the leading edge of the core splitter housing being at a second radial distance of the rotational axis, and a ratio of the first radial distance to the second radial distance being at least 0.95; and
wherein an upstream fan exit guide vane is positioned downstream of the fan blades and upstream of the leading edge of the core splitter housing, wherein the upstream fan exit guide vane is aligned with the rotating bulge.

2. The gas turbine engine as set forth in claim 1, wherein the fan case having a case bulge portion extending to define a radially outermost location aft of a fan case portion aligned with the fan blades.

3. The gas turbine engine as set forth in claim 2, wherein the ratio is at least 1.0.

4. The gas turbine engine as set forth in claim 3, wherein a dirt flap is positioned within the core engine path.

5. The gas turbine engine as set forth in claim 1, wherein the upstream fan exit guide vane does not have constant camber along an entire radial extent.

6. The gas turbine engine as set forth in claim 1, wherein a variable inlet guide vane is positioned aft of the upstream fan exit guide vane, and an orientation of the variable inlet guide vane is changed to control flow downstream of the variable inlet guide vane.

7. The gas turbine engine as set forth in claim 6, wherein a second splitter housing is positioned radially outwardly of the core splitter housing, and a secondary bypass duct is defined inwardly of the second splitter housing.

8. The gas turbine engine as set forth in claim 1, wherein the ratio is at least 1.0.

9. A gas turbine engine comprising:
a fan having a plurality of fan blades received within a fan case, said fan rotating with a rotating cone;
the fan delivering air into a bypass duct radially outwardly of a core splitter housing having a leading edge, and radially inwardly of the core splitter housing into a core engine path leading to a compressor section;
the rotating cone having a rotating bulge defining a radially outermost point of the rotating cone relative to a rotational axis of the fan blades and cone, the rotating bulge defined by a radially outwardly extending forward portion leading to the radially outermost point on the bulge and then a radially inwardly extending portion aft of the radially outermost point of the bulge leading into the core engine path within the core splitter housing, and the bulge radially outermost point being upstream of the leading edge of the core splitter housing, the bulge radially outermost point being a first radial distance from a rotational axis, and the leading edge of the core splitter housing being at a second radial distance of the rotational axis, and a ratio of the first radial distance to the second radial distance being at least 0.95; and
wherein a variable inlet guide vane is not covered radially outward.

10. A gas turbine engine comprising:
a fan having a plurality of fan blades received within a fan case, said fan rotating with a rotating cone;
the fan delivering air into a bypass duct radially outwardly of a core splitter housing having a leading edge, and radially inwardly of the core splitter housing into a core engine path leading to a compressor section;
the rotating cone having a rotating bulge defining a radially outermost point of the rotating cone relative to a rotational axis of the fan blades and cone, the rotating bulge defined by a radially outwardly extending forward portion leading to the radially outermost point on the bulge and then a radially inwardly extending portion aft of the radially outermost point of the bulge leading into the core engine path within the core splitter housing, and the bulge radially outermost point being upstream of the leading edge of the core splitter housing, the bulge radially outermost point being a first radial distance from a rotational axis, and the leading edge of the core splitter housing being at a second radial distance of the rotational axis, and a ratio of the first radial distance to the second radial distance being at least 0.95;
wherein a dirt flap is positioned within the core engine path, and there being a compressor section downstream of the core splitter housing, with the dirt flap being positioned upstream of the compressor section;
wherein an upstream fan exit guide vane is positioned downstream of the fan blades and upstream of the leading edge of the core splitter housing; and
wherein the upstream fan exit guide vane is axially aligned with the rotating bulge.

11. The gas turbine engine as set forth in claim 10, wherein a downstream fan exit guide vane is positioned to extend between the fan case and the core splitter housing.

12. The gas turbine engine as set forth in claim 10, wherein a compressor inlet guide vane is positioned within the core splitter housing and upstream of a compressor section.

13. The gas turbine engine as set forth in claim 10, wherein the upstream fan exit guide vane does not have constant camber along an entire radial extent.

14. The gas turbine engine as set forth in claim 13, wherein there is increased camber in the upstream fan exit guide vanes at a radially inner location.

15. The gas turbine engine as set forth in claim 10, wherein a variable inlet guide vane is positioned aft of the upstream fan exit guide vane, and an orientation of the variable inlet guide vane is changed to control flow downstream of the variable inlet guide vane.

16. The gas turbine engine as set forth in claim 15, wherein a second splitter housing is positioned radially outwardly of the core splitter housing, and a secondary bypass duct is defined inwardly of the second splitter housing.

* * * * *